(12) United States Patent
Xu

(10) Patent No.: US 9,217,586 B1
(45) Date of Patent: Dec. 22, 2015

(54) SINGLE-WELL POWER GENERATION UTILIZING GROUND ENERGY SOURCE

(71) Applicant: Sheng Heng Xu, Waterloo, NE (US)

(72) Inventor: Sheng Heng Xu, Waterloo, NE (US)

( * ) Notice: Subject to any disclaimer, the term of this patent is extended or adjusted under 35 U.S.C. 154(b) by 0 days.

(21) Appl. No.: 14/314,336

(22) Filed: Jun. 25, 2014

Related U.S. Application Data

(60) Provisional application No. 61/840,759, filed on Jun. 28, 2013.

(51) Int. Cl.
| | |
|---|---|
| *F01D 15/10* | (2006.01) |
| *F02C 6/00* | (2006.01) |
| *H02K 7/18* | (2006.01) |
| *H02P 9/04* | (2006.01) |
| *F24J 3/08* | (2006.01) |
| *F28F 7/00* | (2006.01) |

(52) U.S. Cl.
CPC .............. *F24J 3/085* (2013.01); *H02K 7/1823* (2013.01)

(58) Field of Classification Search
USPC ...................... 290/52; 62/110–119, 230–239; 165/185; 126/400
See application file for complete search history.

(56) References Cited

U.S. PATENT DOCUMENTS

| | | | | |
|---|---|---|---|---|
| 4,031,712 A | * | 6/1977 | Costello ........................... | 62/483 |
| 4,103,493 A | * | 8/1978 | Schoenfelder ............. | 60/641.11 |
| 4,165,952 A | * | 8/1979 | Bennett .......................... | 417/207 |
| 4,184,338 A | * | 1/1980 | Bennett ......................... | 62/235.1 |
| 4,285,208 A | * | 8/1981 | Takeshita et al. ............... | 62/141 |
| 4,377,398 A | * | 3/1983 | Bennett .......................... | 96/146 |
| 4,424,681 A | * | 1/1984 | Rice et al. ...................... | 62/114 |
| 4,949,547 A | * | 8/1990 | Shimizu ........................... | 62/79 |
| 5,383,342 A | * | 1/1995 | El-Boher et al. ............... | 62/532 |
| 6,360,730 B1 | * | 3/2002 | Koethe ........................... | 123/541 |
| 8,297,065 B2 | * | 10/2012 | Vaisman et al. ................. | 62/115 |
| 8,484,986 B2 | * | 7/2013 | Waibel ............................ | 62/115 |
| 8,555,666 B1 | * | 10/2013 | Pettus .......................... | 62/238.1 |
| 8,966,916 B2 | * | 3/2015 | Deaconu ......................... | 62/115 |
| 2009/0226308 A1 | * | 9/2009 | Vandor ......................... | 415/178 |
| 2010/0218513 A1 | * | 9/2010 | Vaisman et al. .................... | 62/6 |
| 2010/0243228 A1 | * | 9/2010 | Price ............................ | 165/185 |
| 2011/0204655 A1 | * | 8/2011 | Waibel .......................... | 290/1 R |
| 2012/0167870 A1 | * | 7/2012 | Lavanga et al. ............... | 126/400 |
| 2012/0227426 A1 | * | 9/2012 | Deaconu ......................... | 62/115 |
| 2015/0047378 A1 | * | 2/2015 | Hollingworth ................. | 62/117 |

* cited by examiner

*Primary Examiner* — Pedro J Cuevas
(74) *Attorney, Agent, or Firm* — Suiter Swantz pc llo

(57) ABSTRACT

A ground energy collection system is disclosed. The system includes a well configured to absorb ground energy and provide the absorbed ground energy to a first heat transferring fluid. A pump is used to circulate the first heat transferring fluid to an evaporator. The evaporator is configured to: receive the first heat transferring fluid; facilitate heat exchange between the first heat transferring fluid and a second heat transferring fluid; and return the first heat transferring fluid to the well. A compressor then compresses the second heat transferring fluid. An electricity generator generates electricity based on the second heat transferring fluid received from the compressor. A condenser then retrieves heat and liquefies the second heat transferring fluid. An expansion valve is utilized to regulate pressure of the second heat transferring fluid received from the condenser and return the second heat transferring fluid to the evaporator.

20 Claims, 2 Drawing Sheets

SINGLE-WELL POWER GENERATION UTILIZING GROUND ENERGY SOURCE

CROSS-REFERENCE TO RELATED APPLICATIONS

The present application claims the benefit under 35 U.S.C. §119(e) of U.S. Provisional Application Ser. No. 61/840,759, filed Jun. 28, 2013. Said U.S. Provisional Application Ser. No. 61/840,759 is hereby incorporated by reference in its entirety.

The present application is related to co-pending and concurrently filed U.S. patent application Ser. No. 14/314,391, entitled "Heat Transfer Fluid Based Zero-Gas-Emission Power Generation" listing Sheng Heng Xu as inventor, the entirety of which is incorporated herein by reference.

The present application is also related to co-pending and concurrently filed U.S. patent application Ser. No. 14/314,416, entitled "Ground Energy Harvesting and Accumulating System" listing Sheng Heng Xu as inventor, the entirety of which is incorporated herein by reference.

TECHNICAL FIELD

The disclosure generally relates to the field of power generation, and particularly to a method and system for power generation utilizing ground energy.

BACKGROUND

Geothermal energy is thermal energy generated and stored in the Earth. Heat may be obtained from heat exchangers buried in shallow ground. Energy harvested in this manner may be referred to a shallow geothermal energy.

SUMMARY

The present disclosure is directed to a ground energy collection system. The system includes a well configured to absorb ground energy and provide the absorbed ground energy to a first heat transferring fluid. The system also includes a pump fluidly coupled to the well, the pump configured to facilitate circulating movement of the first heat transferring fluid. The system further includes an evaporator fluidly coupled to the pump and the well, the evaporator configured to: receive the first heat transferring fluid; facilitate heat exchange between the first heat transferring fluid and a second heat transferring fluid; and return the first heat transferring fluid to the well. A compressor fluidly coupled to the evaporator is utilized to compress the second heat transferring fluid to increase temperature and pressure of the second heat transferring fluid. An electricity generator fluidly coupled to the compressor is utilized to generate electricity based on the second heat transferring fluid received from the compressor. A condenser fluidly coupled to the electricity generator is utilized to retrieve heat and liquefy the second heat transferring fluid, and an expansion valve fluidly coupled to the condenser and the evaporator is utilized to regulate pressure of the second heat transferring fluid received from the condenser and return the second heat transferring fluid to the evaporator.

A further embodiment of the present disclosure is also directed to a ground energy collection system, wherein the ground energy collection system is a single-well underground energy collection system.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1:
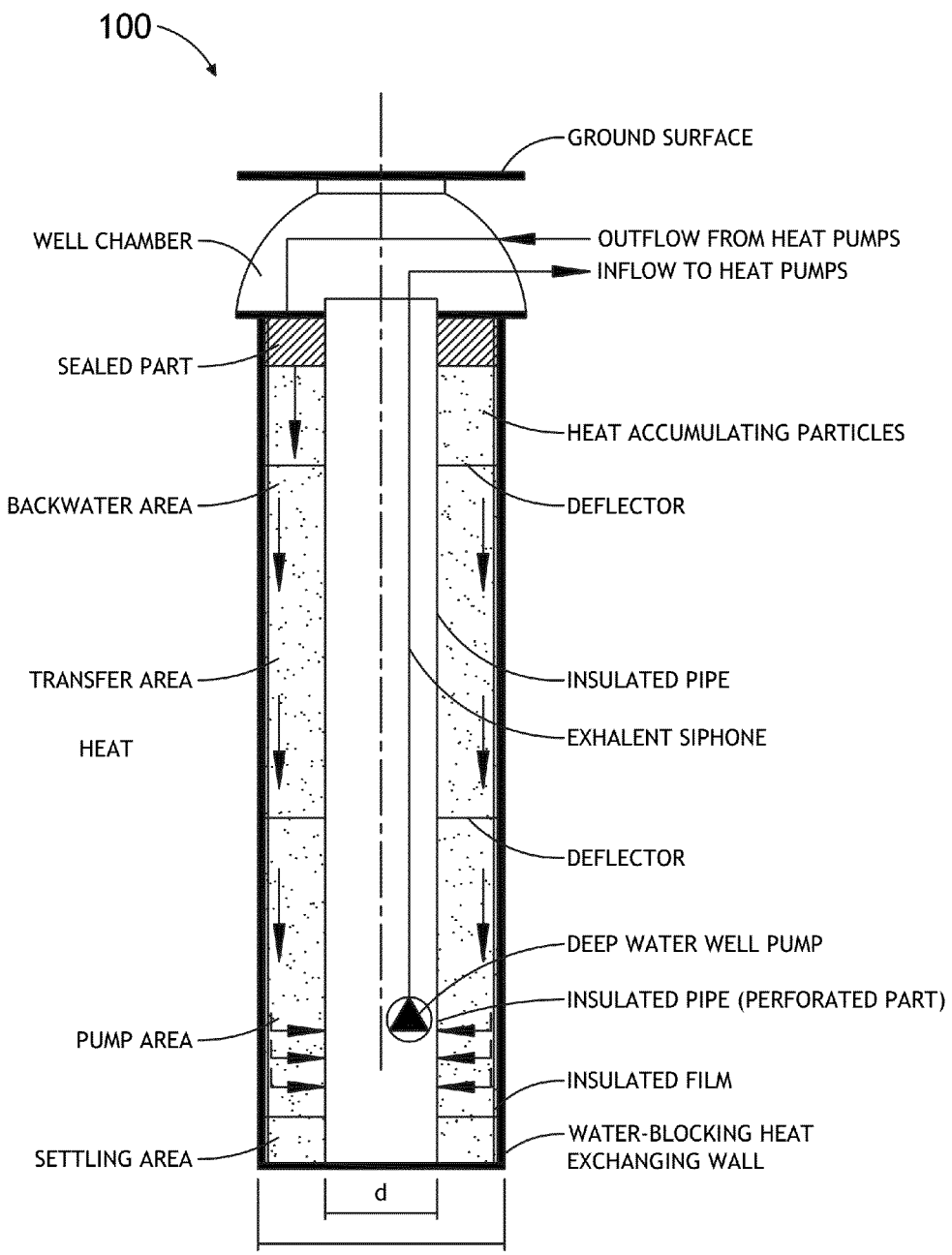
FIG. 1 is a side elevation cross-sectional view of the heat exchanging and accumulating single well system for ground energy collection.

Shallow geothermal energy has been utilized to provide cooling and heating in various applications. For instance, a heat exchanging and accumulating single well system as depicted in FIG. 1 can be utilized for ground energy collection. This heat exchanging and accumulating single well system is further described in U.S. patent application Ser. No. 14/044,549, entitled "Heat Exchanging and Accumulating Single Well for Ground Energy Collection," which is hereby incorporated by reference in its entirety. The heat accumulating single well system 100 collects ground energy (i.e., heat) through cycle water. With stable ground energy sources, the single well system 100 can provide heating, cooling and domestic hot water to buildings.

The present disclosure is directed to greatly enhance the efficiency of such a single well system and use it to generate electricity, which can be utilized year-round.

Figure 2:
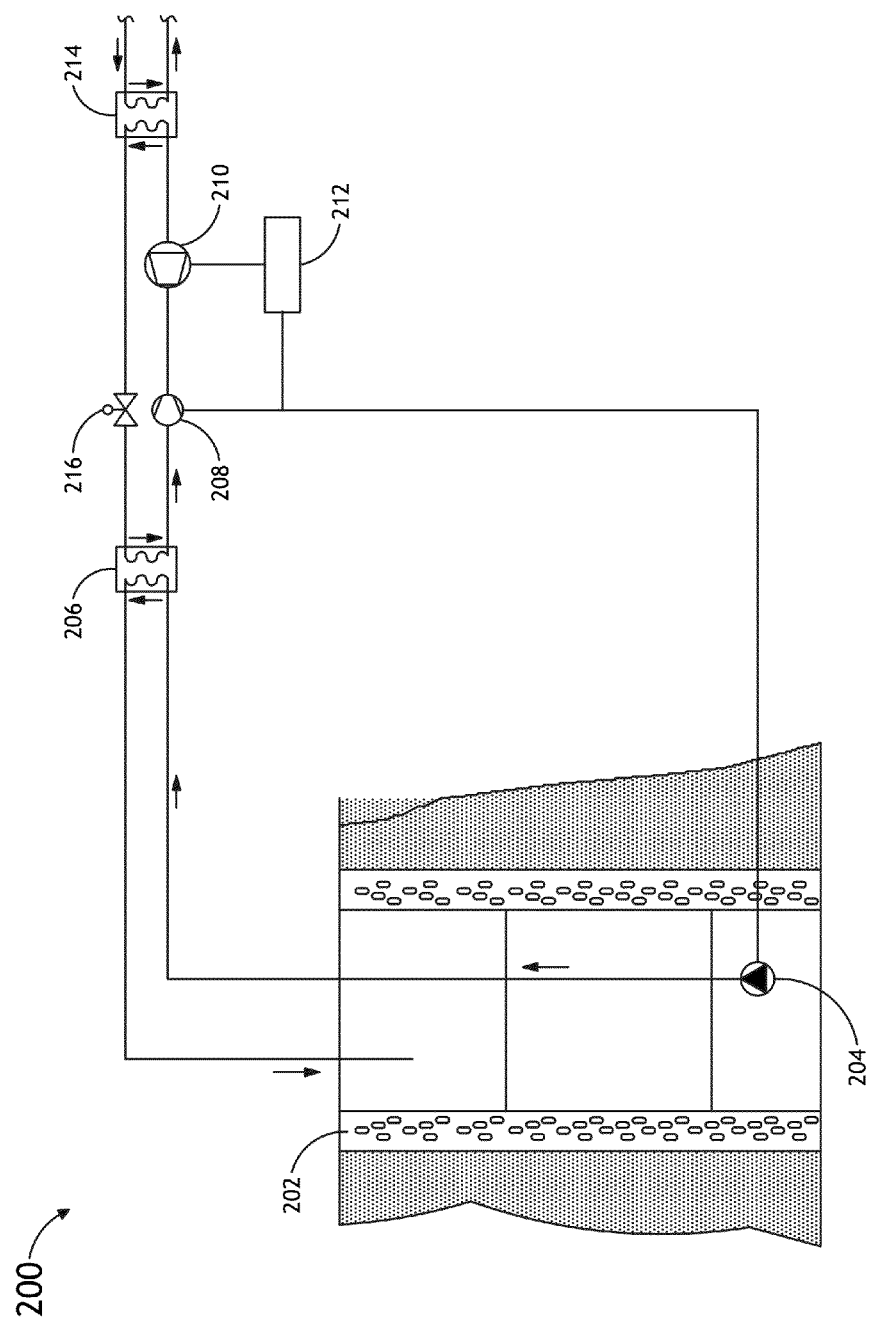
FIG. 2 is a block diagram depicting a single-well power generation system utilizing ground energy.

Referring generally to FIG. 2, a single well power generation system 200 in accordance with the present disclosure is shown. A single well 202 is utilized to harvest the ground energy by circulating heat transferring fluid and continuously supply the harvest heat to an evaporator 206 through a sump pump 204.

The evaporator 206 is configured to provide heat exchange in order to produce the required output fluid. More specifically, the evaporator 206 takes the heat provided by the circulating heat transferring fluid from the sump pump 204 and vaporizes a refrigerant fluid to produce a refrigerant vapor having a low temperature and low pressure. This low temperature low pressure refrigerant vapor is then received by the compressor 208, which changes the low temperature low pressure refrigerant vapor into a high temperature high pressure vapor.

This high temperature high pressure vapor is then delivered to a generator 210. In one embodiment, the high temperature high pressure vapor actuates/spins one or more axels to generate electricity. The electricity may be delivered for consumption and/or stored in a battery 212. A portion of the electricity generated may also be used to power the sump pump 204.

After passing through the generator 210, the pressure of the high temperature high pressure vapor is lowered. It then passes through a condenser/liquefier 214, which is utilized to retrieve the heat and turns the vapor into a liquid form having a low temperature and low pressure. An expansion valve 216 is then utilized to adjust its pressure and recycles it into the evaporator 206. This cycle can repeat continuously to provide power generation.

It is contemplated that the single well power generation system in accordance with the present disclosure may be configured as a dual-function system for both heating and power generation. The amount of ground energy utilized for heating and the amount of ground energy utilized for power generation may be adjusted according to specific needs without departing from the spirit and scope of the present disclosure.

It is also contemplated that the single well power generation system in accordance with the present disclosure can be utilized wherever the shallow ground temperature is greater than the phase changing temperature of the heat accumulating particles. In one embodiment, the phase changing temperature of the heat accumulating particles is approximately 0° C. (e.g., from water to ice), and the single well power generation system in accordance with the present disclosure can be utilized wherever the shallow ground temperature is greater than or equal to approximately 10° C. It is contemplated that various other types of heat accumulating particles may be utilized, and the temperature requirement for the shallow ground may also vary without departing from the spirit and scope of the present disclosure.

It is understood that the present disclosure is not limited to any underlying implementing technology. The present disclosure may be implemented using a variety of technologies without departing from the scope and spirit of the disclosure or without sacrificing all of its material advantages.

It is believed that the present disclosure and many of its attendant advantages will be understood by the foregoing description, and it will be apparent that various changes may be made in the form, construction, and arrangement of the components thereof without departing from the scope and spirit of the disclosure or without sacrificing all of its material advantages. The form herein before described being merely an explanatory embodiment thereof, it is the intention of the following claims to encompass and include such changes.

What is claimed is:

1. A ground energy collection system, comprising:
   a well configured to absorb ground energy and provide the absorbed ground energy to a first heat transferring fluid;
   a pump fluidly coupled to the well, the pump configured to facilitate circulating movement of the first heat transferring fluid;
   an evaporator fluidly coupled to the pump and the well, the evaporator configured to:
      receive the first heat transferring fluid;
      facilitate heat exchange between the first heat transferring fluid and a second heat transferring fluid; and
      return the first heat transferring fluid to the well;
   a compressor fluidly coupled to the evaporator, the compressor configured to compress the second heat transferring fluid to increase temperature and pressure of the second heat transferring fluid;
   an electricity generator fluidly coupled to the compressor, the electricity generator configured to generate electricity based on the second heat transferring fluid received from the compressor;
   a condenser fluidly coupled to the electricity generator, the condenser configured to retrieve heat and liquefy the second heat transferring fluid; and
   an expansion valve fluidly coupled to the condenser and the evaporator, the expansion valve configured to regulate pressure of the second heat transferring fluid received from the condenser and return the second heat transferring fluid to the evaporator.

2. The ground energy collection system of claim 1, wherein the heat exchange between the first heat transferring fluid and the second heat transferring fluid in the evaporator vaporizes the second heat transferring fluid.

3. The ground energy collection system of claim 1, wherein at least a portion of the electricity generated by the electricity generator is stored in a battery.

4. The ground energy collection system of claim 1, wherein at least a portion of the electricity generated by the electricity generator is provided to power the compressor.

5. The ground energy collection system of claim 1, wherein at least a portion of the electricity generated by the electricity generator is provided to power the pump.

6. The ground energy collection system of claim 1, wherein the well includes:
   a water-blocking heat-exchanging outer wall defining an enclosure;
   an insulated tube located inside the enclosure; and
   a plurality of heat exchanging particles disposed between the outer wall and the insulated tube.

7. The ground energy collection system of claim 6, wherein a phase changing temperature of the plurality of heat exchanging particles is approximately 0° C.

8. A ground energy collection system, comprising:
   a well configured to absorb ground energy and provide the absorbed ground energy to a first heat transferring fluid;
   a pump fluidly coupled to the well, the pump configured to facilitate circulating movement of the first heat transferring fluid;
   an evaporator fluidly coupled to the pump and the well, the evaporator configured to:
      receive the first heat transferring fluid;
      facilitate heat exchange between the first heat transferring fluid and a second heat transferring fluid, wherein the heat exchange between the first heat transferring fluid and the second heat transferring fluid in the evaporator vaporizes the second heat transferring fluid; and
      return the first heat transferring fluid to the well;
   a compressor fluidly coupled to the evaporator, the compressor configured to compress the second heat transferring fluid to increase temperature and pressure of the second heat transferring fluid;
   an electricity generator fluidly coupled to the compressor, the electricity generator configured to generate electricity based on the second heat transferring fluid received from the compressor;
   a condenser fluidly coupled to the electricity generator, the condenser configured to retrieve heat and liquefy the second heat transferring fluid; and
   an expansion valve fluidly coupled to the condenser and the evaporator, the expansion valve configured to regulate pressure of the second heat transferring fluid received from the condenser and return the second heat transferring fluid to the evaporator.

9. The ground energy collection system of claim 8, wherein at least a portion of the electricity generated by the electricity generator is stored in a battery.

10. The ground energy collection system of claim 8, wherein at least a portion of the electricity generated by the electricity generator is provided to power the compressor.

11. The ground energy collection system of claim 8, wherein at least a portion of the electricity generated by the electricity generator is provided to power the pump.

12. The ground energy collection system of claim 8, wherein the well includes:
- a water-blocking heat-exchanging outer wall defining an enclosure;
- an insulated tube located inside the enclosure; and
- a plurality of heat exchanging particles disposed between the outer wall and the insulated tube.

13. The ground energy collection system of claim 12, wherein a phase changing temperature of the plurality of heat exchanging particles is approximately 0° C.

14. A single-well underground energy collection system, comprising:
- a well configured to absorb ground energy and provide the absorbed ground energy to a first heat transferring fluid, wherein the well includes:
  - a water-blocking heat-exchanging outer wall defining an enclosure;
  - an insulated tube located inside the enclosure; and
  - a plurality of heat exchanging particles disposed between the outer wall and the insulated tube;
- a pump fluidly coupled to the well, the pump configured to facilitate circulating movement of the first heat transferring fluid;
- an evaporator fluidly coupled to the pump and the well, the evaporator configured to:
  - receive the first heat transferring fluid;
  - facilitate heat exchange between the first heat transferring fluid and a second heat transferring fluid; and
  - return the first heat transferring fluid to the well;
- a compressor fluidly coupled to the evaporator, the compressor configured to compress the second heat transferring fluid to increase temperature and pressure of the second heat transferring fluid;
- an electricity generator fluidly coupled to the compressor, the electricity generator configured to generate electricity based on the second heat transferring fluid received from the compressor;
- a condenser fluidly coupled to the electricity generator, the condenser configured to retrieve heat and liquefy the second heat transferring fluid; and
- an expansion valve fluidly coupled to the condenser and the evaporator, the expansion valve configured to regulate pressure of the second heat transferring fluid received from the condenser and return the second heat transferring fluid to the evaporator.

15. The single-well underground energy collection system of claim 14, wherein the heat exchange between the first heat transferring fluid and the second heat transferring fluid in the evaporator vaporizes the second heat transferring fluid.

16. The single-well underground energy collection system of claim 14, wherein at least a portion of the electricity generated by the electricity generator is stored in a battery.

17. The single-well underground energy collection system of claim 14, wherein at least a portion of the electricity generated by the electricity generator is provided to power the compressor.

18. The single-well underground energy collection system of claim 14, wherein at least a portion of the electricity generated by the electricity generator is provided to power the pump.

19. The single-well underground energy collection system of claim 14, wherein a phase changing temperature of the plurality of heat exchanging particles is approximately 0° C.

20. The single-well underground energy collection system of claim 14, wherein the well is located in an area having shallow ground temperature greater than or equal to approximately 10° C.

* * * * *